United States Patent
Lundén et al.

(10) Patent No.: US 12,149,953 B2
(45) Date of Patent: Nov. 19, 2024

(54) CELL OVERLAP ANALYSIS

(71) Applicant: Elisa Oyj, Helsinki (FI)

(72) Inventors: Petteri Lundén, Helsinki (FI); Jukka-Pekka Salmenkaita, Helsinki (FI); Adriana Chis, Helsinki (FI); Mateo Rendon, Helsinki (FI)

(73) Assignee: Elisa Oyj, Helsinki (FI)

( * ) Notice: Subject to any disclaimer, the term of this patent is extended or adjusted under 35 U.S.C. 154(b) by 349 days.

(21) Appl. No.: 17/781,975

(22) PCT Filed: Nov. 23, 2020

(86) PCT No.: PCT/FI2020/050788
§ 371 (c)(1),
(2) Date: Jun. 2, 2022

(87) PCT Pub. No.: WO2021/111032
PCT Pub. Date: Jun. 10, 2021

(65) Prior Publication Data
US 2023/0022247 A1   Jan. 26, 2023

(30) Foreign Application Priority Data
Dec. 4, 2019  (FI) ...................................... 20196055

(51) Int. Cl.
H04W 16/18    (2009.01)
H04W 24/02    (2009.01)
H04W 64/00    (2009.01)

(52) U.S. Cl.
CPC ........... H04W 16/18 (2013.01); H04W 24/02 (2013.01); H04W 64/003 (2013.01); H04W 64/006 (2013.01)

(58) Field of Classification Search
CPC ..... H04W 16/18; H04W 16/32; H04W 24/02; H04W 64/003; H04W 64/006
See application file for complete search history.

(56) References Cited

U.S. PATENT DOCUMENTS 7,072,663 B2 * 7/2006 Ramos ................. H04W 16/14
                                                   455/436
7,734,312 B2 * 6/2010 Hosono ................ H04W 88/08
                                                   455/515

(Continued)

FOREIGN PATENT DOCUMENTS

CN    108668293 A    10/2018
CN    108990078 A    12/2018
WO    2019096399 A1   5/2019

OTHER PUBLICATIONS

3GPP TS 28.628 V15.1.0 (Mar. 2019). 3rd Generation Partnership Project; Technical Specification Group Services and System Aspects, 65 pages.

(Continued)

*Primary Examiner* — Alpus Hsu
(74) *Attorney, Agent, or Firm* — Ziegler IP Law Group LLC.

(57) ABSTRACT

A computer implemented method of cell overlap analysis of a communication network. The method includes determining coverage area of a first and a second cell of the communication network, wherein determination of the coverage area of a cell is based on user distribution in the respective cell; determining intersecting area as an area where the determined coverage area of the first cell and the determined coverage area of the second cell overlap; and determining a first impact value reflecting impact of the overlap on the first cell as a ratio of the determined intersecting area and the determined coverage area of the first cell.

17 Claims, 8 Drawing Sheets

(56) References Cited

U.S. PATENT DOCUMENTS

| | | | | |
|---|---|---|---|---|
| 8,903,403 B2* | 12/2014 | Li | ............... | H04W 24/02 |
| | | | | 455/443 |
| 9,002,362 B2* | 4/2015 | Marce | ............... | H04W 36/0061 |
| | | | | 455/436 |
| 9,154,978 B2* | 10/2015 | Chou | ............... | H04W 16/18 |
| 9,648,534 B2* | 5/2017 | Morad | ............... | H04W 52/0206 |
| 9,991,976 B2* | 6/2018 | Hu | ............... | H04L 25/03968 |
| 10,098,007 B2 | 10/2018 | Chandrasekaran et al. | | |
| 10,305,649 B2* | 5/2019 | Fang | ............... | H04W 72/541 |
| 10,972,918 B2 | 4/2021 | Poutanen | | |
| 2011/0130135 A1 | 6/2011 | Trigui | | |
| 2015/0223084 A1 | 8/2015 | Lightstone et al. | | |
| 2016/0066191 A1* | 3/2016 | Li | ............... | H04W 52/244 |
| | | | | 455/443 |

OTHER PUBLICATIONS

Chiu et al, 'Big Data Analytics for 4.9G and 5G Mobile Network Optimization', 2017 IEEE 85th Vehicular Technology Conference: VTC2017—Spring, 4 pages.

Notification of Transmittal of the International Search Report and the Written Opinion of the International Searching Authority, or the Declaration, Application No. PCT/FI2020/050788, Mailed Feb. 16, 2021, 13 pages.

Finnish Patent and Registration Office, Search Report, Application No. 20196055, Mailed Jun. 25, 2020, 4 pages.

* cited by examiner

CELL OVERLAP ANALYSIS

TECHNICAL FIELD

The present application generally relates to analyzing cell overlap in communication networks.

BACKGROUND

This section illustrates useful background information without admission of any technique described herein representative of the state of the art.

Communication networks comprise a plurality of cells serving users of the network. When users of the communication network move in the area of the network, connections of the users are seamlessly handed over between cells of the network.

Depending on network structure, cell sizes may vary, and coverage area of neighboring cells may overlap. Due to overlapping coverage area, cells may have certain adverse impact on performance of other cells (e.g. interference). Cells should provide sufficient signal level in the coverage area to ensure quality of service. Moreover, some overlap between neighboring cells is necessary to facilitate reliable handovers, but at the same time adverse impact on performance of other cells due too much overlap is not desired.

In order to perform educated decisions on network management operations, there is a need to analyze how cells impact each other. For example, trace data can be used for this purpose. The challenge is that trace data is expensive or difficult to obtain.

SUMMARY

Various aspects of examples of the disclosed embodiments are set out in the claims. Any devices and/or methods in the description and/or drawings which are not covered by the claims are examples useful for understanding the disclosed embodiments.

According to a first example aspect of the disclosed embodiments, there is provided a computer implemented method of cell overlap analysis for cells of a communication network. The method comprises
  determining coverage area of a first and a second cell of the communication network, wherein determination of the coverage area of a cell is based on user distribution in the respective cell;
  determining intersecting area as an area where the determined coverage area of the first cell and the determined coverage area of the second cell overlap; and
  determining a first impact value reflecting impact of the overlap on the first cell as a ratio of the determined intersecting area and the determined coverage area of the first cell.

In an example embodiment, the method further comprises determining a second impact value reflecting impact of the overlap on the second cell as a ratio of the determined intersecting area and the determined coverage area of the second cell.

In an example embodiment, the method further comprises outputting the determined impact value(s).

In an example embodiment, the method further comprises using the determined impact value(s) for determining value for at least one network parameter in the communication network.

In an example embodiment, the method further comprises using the determined impact value(s) for identifying overshooter cells in the communication network.

In an example embodiment, the method further comprises using the determined impact value(s) for analyzing and adjusting antenna tilts in the communication network.

In an example embodiment, the method further comprises using the determined impact value(s) for detecting and/or reducing overlap between cells in the communication network.

In an example embodiment, the method further comprises using the determined impact value(s) for analyzing and adjusting cell neighborhoods in the communication network.

In an example embodiment, the method further comprises using the determined impact value(s) for controlling energy saving procedures in the communication network.

In an example embodiment, predefined percentile of users is taken into account in determination of the cell coverage of a cell. The predefined percentile of users may be different or same for the first cell and the second cell.

In an example embodiment, the user distribution is determined based on timing advance values obtained from the cells of the communication network.

In an example embodiment, the determination of the cell coverage of a cell is further based on cell coordinates, antenna beam width, and antenna bearing of the respective cell. Also antenna patterns may be used.

In an example embodiment, the cell overlap analysis is performed for a plurality of pairs of first and second cells.

In an example embodiment, the method further comprises periodically repeating the cell overlap analysis.

In an example embodiment, the method further comprises omitting user distribution information obtained during periods of time when at least one of the first cell and the second cell is not in use.

In an example embodiment, the method further comprises splitting coverage areas of at least one of the first and second cells into a plurality of sub-areas and performing the cell overlap analysis separately for different sub areas. The method may further comprise taking into account non-uniform user distribution by giving weight to a certain sub-area based on number of users and/or amount of traffic in the respective sub-area.

In an example embodiment, the method further comprises aggregating, for a given first cell, impact values related to multiple second cells to determine total impact on the first cell.

According to a second example aspect of the disclosed embodiments, there is provided an apparatus comprising a processor and a memory including computer program code; the memory and the computer program code configured to, with the processor, cause the apparatus to perform the method of the first aspect or any related embodiment.

According to a third example aspect of the disclosed embodiments, there is provided a computer program comprising computer executable program code which when executed by a processor causes an apparatus to perform the method of the first aspect or any related embodiment.

The computer program of the third aspect may be a computer program product stored on a non-transitory memory medium.

Different non-binding example aspects and embodiments of the present disclosure have been illustrated in the foregoing. The embodiments in the foregoing are used merely to explain selected aspects or steps that may be utilized in implementations of the present disclosure. Some embodiments may be presented only with reference to certain example aspects of the disclosed embodiments. It should be appreciated that corresponding embodiments may apply to other example aspects as well.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF THE DRAWINGS

Example embodiments of the present disclosure and its potential advantages are understood by referring to FIGS. 1 through 6B of the drawings. In this document, like reference signs denote like parts or steps.

Example embodiments of the present disclosure provide new mechanisms to analyze cell overlap of communication networks. In this way it is possible to obtain information on how cells impact each other, and this information can be used for performing network management operations with the aim to continuously improve operation of the network. The network management operations may relate for example to finding overshooter or interfered cells, adjusting antenna tilts, detecting and/or reducing overlap between cells, adjusting neighbor relations, and identifying cells suited for energy saving operations.

Certain example embodiments of the present disclosure are based on using user distribution (obtained e.g. from timing advance data and user locations determined based on timing advance data) and network topology data to analyze cell overlap. In some example embodiments, the user distribution may be based on approximate user locations, determined for example based on the timing advance information, which is representative of the signal propagation delay from the user equipment to the base station. Timing advance can be converted into physical distance (e.g. in meters). The timing advance values may be collected as binned histogram, which means that the exact timing advances may not be known, just the number samples falling in certain ranges of values. For example, it could be known that a certain user is between 78 and 156 meters from the base station. Example embodiments are applicable also with such limited accuracy data.

Cells may be analyzed in pairs or multiple cells may be taken into account at the same time. The analysis may be limited to certain geographical area or otherwise limited area, but it is possible to analyze a whole network, too.

Figure 1:
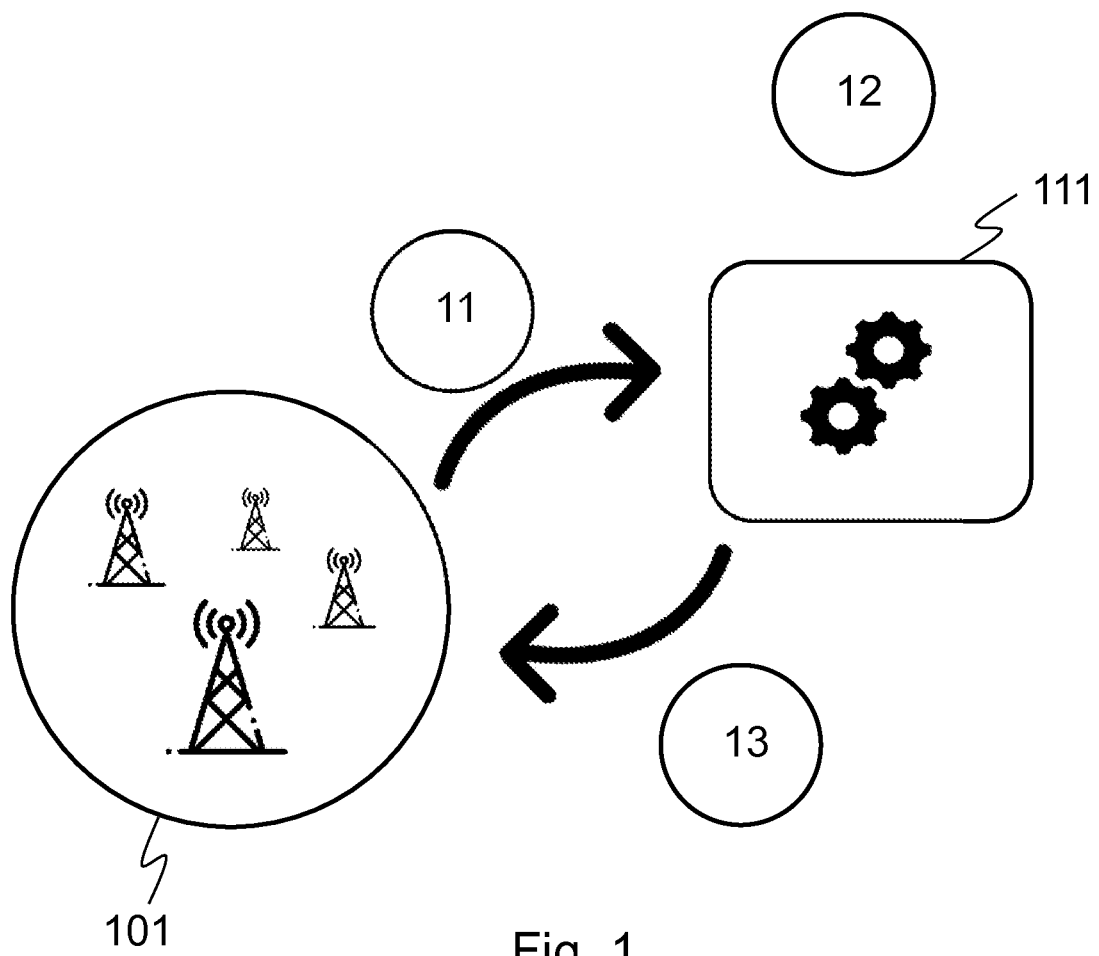
FIG. 1 shows an example scenario according to an embodiment.

FIG. 1 shows an example scenario according to an embodiment. The scenario shows a communication network 101 comprising a plurality of cells and base stations and other network devices, and an automation system 111 configured to implement (automatic) cell overlap analysis according to example embodiments.

In an embodiment the scenario of FIG. 1 operates as follows: In phase 11, the automation system 111 obtains data from cells of the network. The data includes e.g. timing advance data that can be used for determining user locations and user distribution in the cells. Also other data may be obtained from the cells or from network design systems. The process may be manually or automatically triggered. The process may be triggered, for example, in response to observing a performance problem or degradation in the network or in a particular area or cell. Additionally or alternatively, the process may be periodically repeated. Data is obtained over a predefined period of time to collect sufficient data for determining cell overlaps. The predefined period of time may be for example minutes, hours, days, weeks, or months and may vary e.g. between 15 minutes and 1 month. More specific non-limiting examples comprise 15 minutes, 30 minutes, 1 hour, 2-12 hours, 1-3 days, 1 week, 2 weeks, 3 weeks, one month, or some other period of time.

In phase 12, the automation system 111 uses the obtained data to analyze cell overlaps in the network. Results of the analysis may be used for determining certain network management operations and for example to determine value for at least one network parameter in the communication network.

In phase 13, any determined network parameter changes or other actions are deployed in the communication network 101.

The process may be repeated for example once a day, every other day, every three days, once a week, every two weeks, once a month, or every two months. By periodically repeating the process, network management operations performed on the basis of the cell overlap analysis adapt to changes in the network load, changes in network usage patterns, and/or changes in the network configuration such as adding new cells or removing or reconfiguring existing cells.

Some of the cells in the network may be temporarily not in use (e.g. powered off) e.g. for energy saving or maintenance purposes. In this case, the neighboring cells typically cover for the cell that is offline (serving users that would be otherwise served by the offline cell). In such cases, cell overlap analysis based on data collected and aggregated over a period including such power offs may be misleading. In an example embodiment, this situation is addressed by adapting the method to only consider the (timing advance) data collected from those time periods where none of the cells whose overlap is being computed is powered off or otherwise offline. The data collected during a time period, when one of the cells is not in use, is omitted.

It is to be noted that although timing advance data is typically collected from a plurality of cells, analysis of cell overlap can be performed individually for individual cell pairs. Alternatively, multiple cell pairs can be analyzed in parallel. Any network management actions resulting from the analyses may be limited so that multiple simultaneous changes are avoided in the same geographical area. In this way it is easier to keep track on changes made in the network and their effects.

Figure 2:
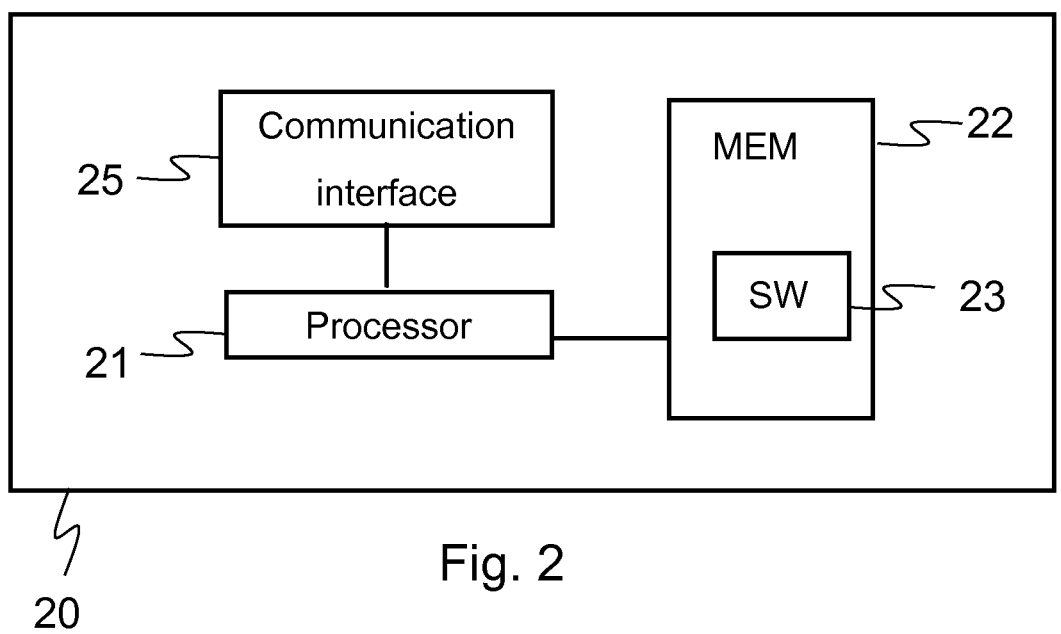
FIG. 2 shows an apparatus according to an embodiment.

FIG. 2 shows an apparatus 20 according to an embodiment. The apparatus 20 is for example a general-purpose computer or server or some other electronic data processing apparatus. The apparatus 20 can be used for implementing embodiments of the present disclosure. That is, with suitable configuration the apparatus 20 is suited for operating for example as the automation system 111 of foregoing disclosure.

The general structure of the apparatus 20 comprises a processor 21, and a memory 22 coupled to the processor 21. The apparatus 20 further comprises software 23 stored in the memory 22 and operable to be loaded into and executed in the processor 21. The software 23 may comprise one or more software modules and can be in the form of a computer program product. Further, the apparatus 20 comprises a communication interface 25 coupled to the processor 21.

The processor 21 may comprise, e.g., a central processing unit (CPU), a microprocessor, a digital signal processor (DSP), a graphics processing unit, or the like. FIG. 2 shows one processor 21, but the apparatus 20 may comprise a plurality of processors.

The memory 22 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories.

The communication interface 25 may comprise communication modules that implement data transmission to and from the apparatus 20. The communication modules may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. Further the apparatus 20 may comprise a user interface (not shown) for providing interaction with a user of the apparatus. The user interface may comprise a display and a keyboard, for example. The user interaction may be implemented through the communication interface 25, too.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2, but the embodiments of the present disclosure may equally be implemented in a cluster of shown apparatuses.

Figure 3:
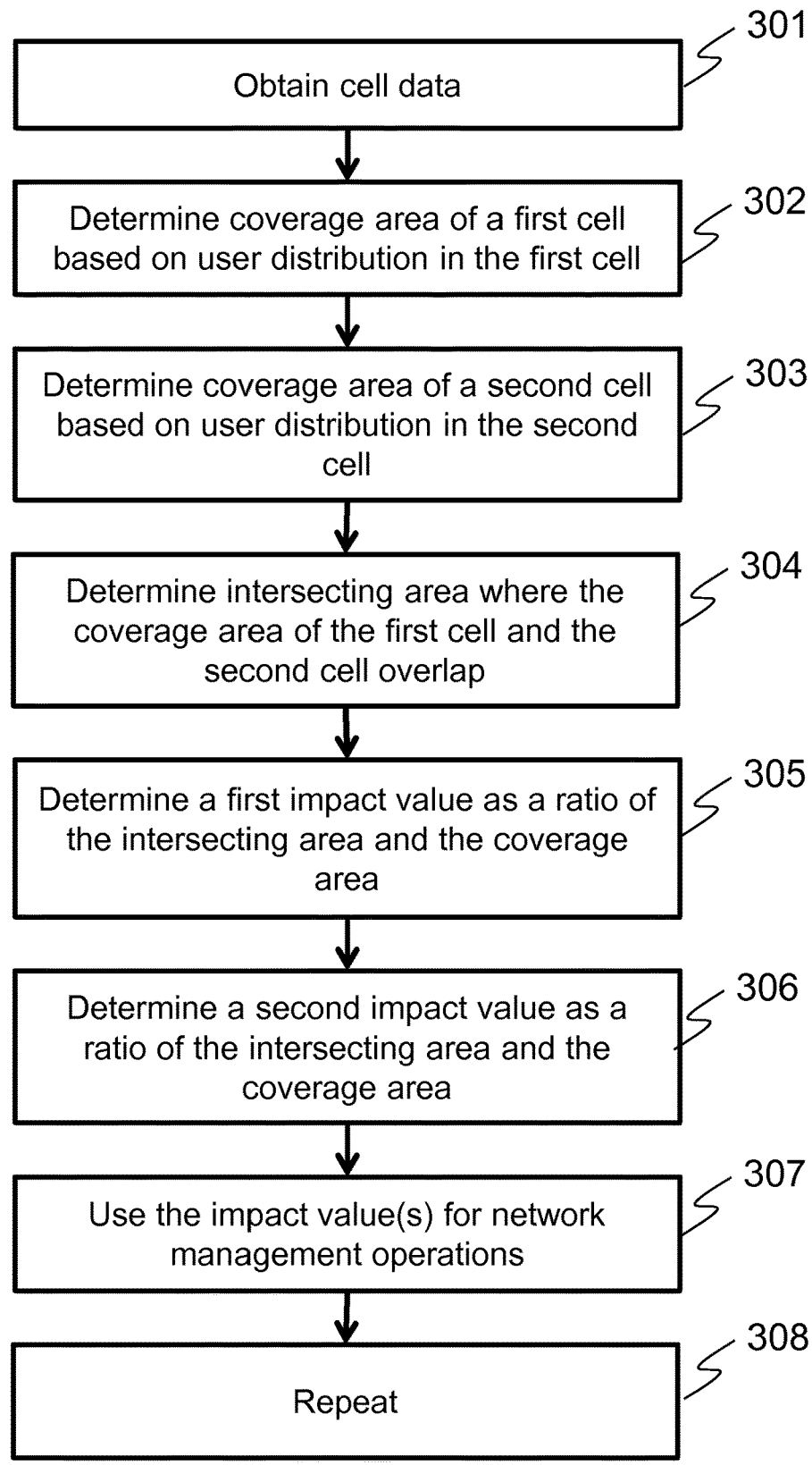
FIG. 3 shows a flow diagram illustrating example methods according to certain embodiments.

FIG. 3 shows a flow diagram illustrating example methods according to certain embodiments. The methods may be implemented in the automation system 111 of FIG. 1 and/or in the apparatus 20 of FIG. 2. The methods are implemented in a computer and do not require human interaction unless otherwise expressly stated. It is to be noted that the methods may however provide output that may be further processed by humans and/or the methods may require user input to start. Different phases shown in FIG. 3 may be combined with each other and the order of phases may be changed except where otherwise explicitly defined. Furthermore, it is to be noted that performing all phases of the flow charts is not mandatory.

The method of FIG. 3 provides cell overlap analysis of cells of a communication network for network optimization purposes, and comprises following phases:

Phase 301: Cell data is obtained. The data may comprise for example dynamic usage data obtained from cells and base stations and network topology data obtained from network design systems. The dynamic usage data may comprise for example timing advance data.

Phase 302: Coverage area of a first cell of the communication network is determined based on user distribution in the first cell.

Phase 303: Coverage area of a second cell of the communication network is determined based on user distribution in the second cell.

The user distribution is determined based on the obtained cell data and more particularly e.g. based on approximate user locations. For example, timing advance data can be used in phases 302 and 303 for approximating users' distances from the base station of the cell. The timing advance values may be collected as binned histogram, which means that the exact timing advances may not be known, just the number samples falling in certain ranges of values. For example, it could be known that a certain user is between 78 and 156 meters from the base station or that there are certain number of users between the 78- and 156-meter distance from the base station. If there is a need to find number of users within some other range than the range defined by the bin edges, the user distribution between the bin edges can be interpolated. For the purpose of extrapolating, it can be for example assumed that the users are uniformly distributed between the bin edges. In addition to user distribution also network topology data such as cell coordinates, antenna bearings, antenna patterns, and antenna beam widths can be used in determination of the cell coverage areas.

Phase 304: An intersecting area is determined as an area where the determined coverage area of the first cell and the determined coverage area of the second cell overlap.

Phase 305: A first impact value is determined. The first impact value reflects impact of the overlap on the first cell and is defined as a ratio of the determined intersecting area and the determined coverage area of the first cell. The first impact value may be alternatively defined as reflecting impact of the second cell on the first cell.

Phase 306: A second impact value is determined. The second impact value reflects impact of the overlap on the second cell and is defined as a ratio of the determined intersecting area and the determined coverage area of the second cell. The second impact value may be alternatively defined as reflecting impact of the first cell on the second cell. It is to be noted that it is not mandatory to determine both the first impact value and the second impact value. Instead, only one of these may suffice.

Phase 307: The determined impact value(s) are output so that they can be used for network management operations in order to optimize network. The impact value(s) may be displayed and/or used for one or more of the following: determining value for at least one network parameter in the communication network, identifying overshooter cells, analyzing and adjusting antenna tilts in the communication network, detecting and/or reducing overlap between cells in the communication network, analyzing and adjusting cell neighborhoods in the communication network, and controlling energy saving procedures in the network. In an example embodiment, it is checked if impact values caused by a certain cell or experienced at a certain cell exceed a threshold value. When it is determined that the threshold is exceeded, network management actions are triggered, while impact values below the threshold may be ignored. The impact value that is considered may be an aggregated impact value taking into account interaction between multiple cells.

Phase 308: The phases 301-307 or some of them are repeated when necessary and/or periodically.

It is to be noted that anywhere in this document, the term cell coverage does not necessarily refer to 100% coverage area of the cell, but instead to a significant or desired or experienced coverage area or area that fulfills predefined criteria. For example, the timing advance data does not convey information of the bearing of the users, so the coverage determined using such distance data is going to have some level of uncertainty. This is, however, a reasonable trade-off considering the feasibility of acquiring and analyzing the data.

In an example embodiment, a predefined percentile of users is taken into account in determination of the cell coverage. For example, it may be considered that it suffices to consider the impact that 90% of the users of certain cell cause or to consider the impact on 90% of the users of the cell. 10% of the users furthest apart from the base station may be ignored. The percentile that is applied may vary depending on the implementation. For example, $40^{th}$, $50^{th}$, $70^{th}$, $80^{th}$, $90^{th}$, or $95^{th}$ percentile or some other percentile may be used. The predefined percentile of users may be different or the same for the first cell and the second cell. In an example embodiment, the cell coverage area may be split into sub-areas so that each sub-area covers certain percentile(s) of users.

Figure 4A:
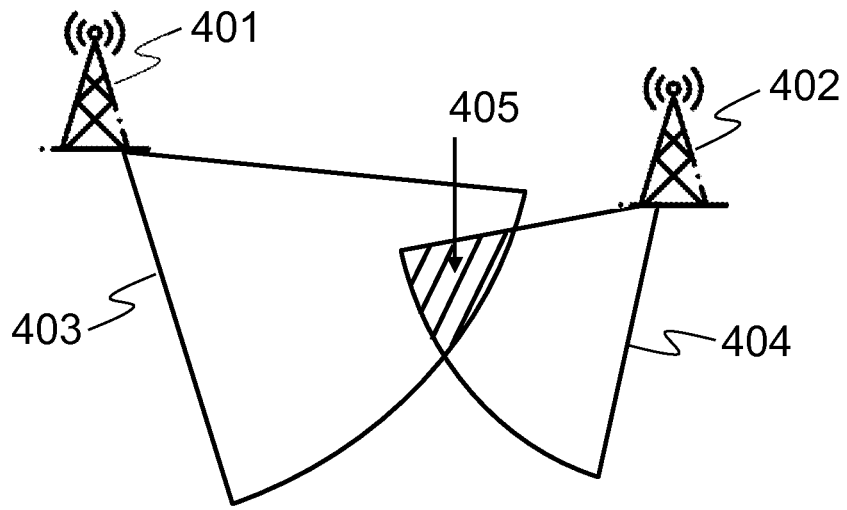
FIGS. 4A-4C illustrate certain cell overlap examples.
Figure 4B:
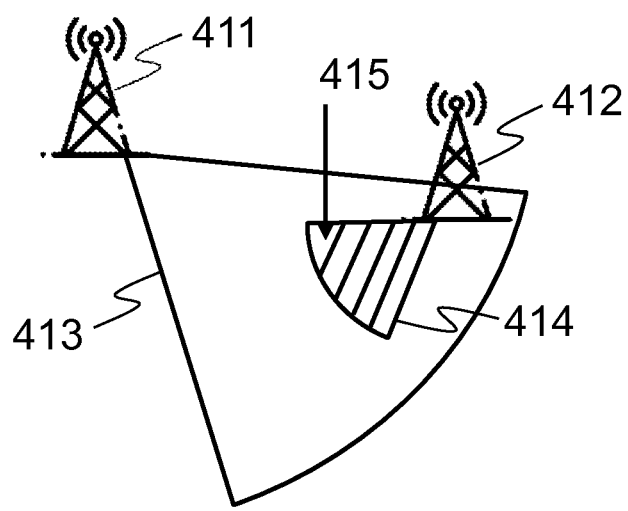
Figure 4C:
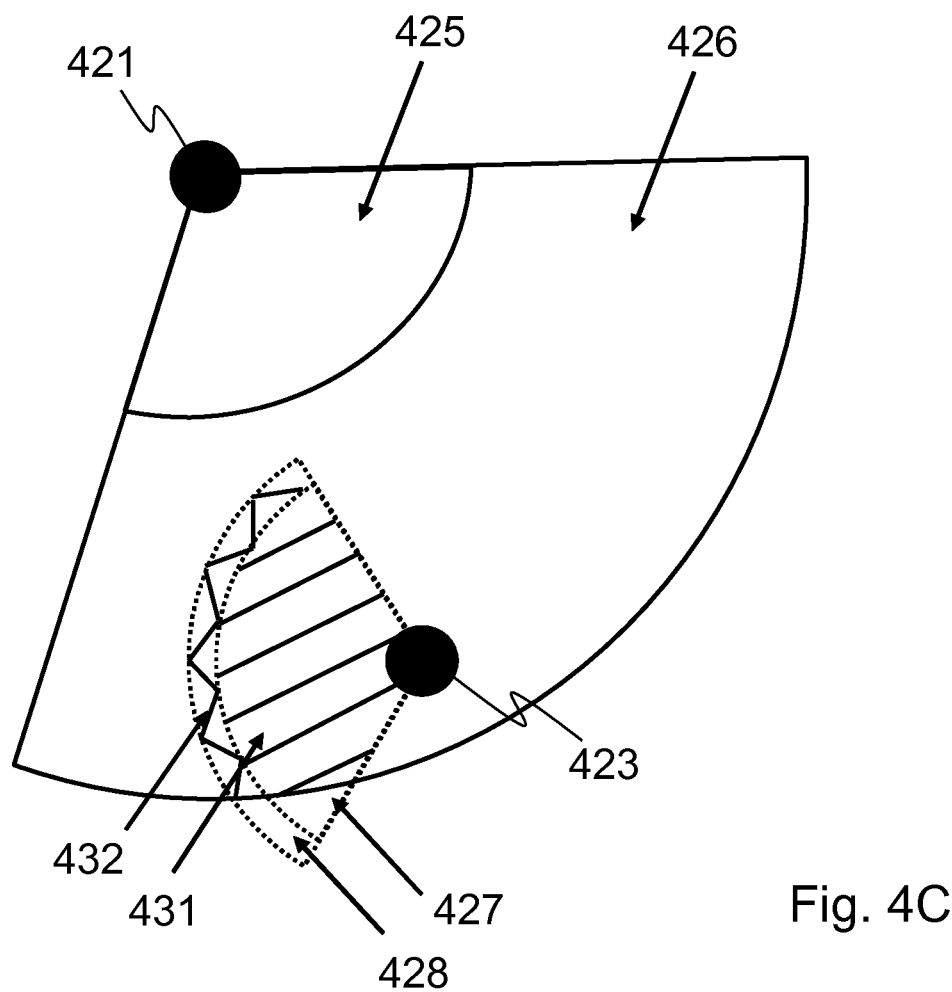

FIGS. 4A-4C illustrate certain cell overlap examples. FIG. 4A shows a base station 401 of a first cell and coverage area 403 of the first cell. Likewise, FIG. 4A shows a base station 402 of a second cell and coverage area 404 of the second cell. Coverage areas 403 and 404 of the first and second cell overlap at intersecting area 405. In this example it is likely that the overlap has relatively small impact on both the first and the second cell because it represents only a small portion of either the first cell coverage area 403 or the second cell coverage area 404.

In an example embodiment, the coverage area of a cell is approximated by a circular sector pointing in the direction of bearing of antenna of the cell. The origin of the sector is at cell's coordinates (latitude, longitude). Sector's width is based on antenna's beam width. The length of the sector is determined by the distance to users. In practice, the users that are furthest away from the base station of the cell determine the length of the sector.

In an example embodiment, the coverage area 403 of the first cell is denoted $A_1$ and the coverage area 404 of the second cell is denoted $A_2$. These may be computed by approximating the corresponding circular sectors with polygons. The geographical area of the polygon of the intersecting area 405 is denoted I.

In another example embodiment, the area of the circular sector may be approximated by dividing the area of interest into a grid of points (e.g. 50 meter spacing and determining which of the grid points are within each area. The area is then approximated to be directly proportional to the number of grid points falling inside it.

Now, a first impact value $O_1$ reflecting impact of the overlap on the first cell is defined as a ratio of the determined intersecting area and the determined coverage area of the first cell. $O_1$ may be defined as $$O_1 = \frac{I \times 100}{A_1},$$

where the factor 100 is for expressing the result as a percentage.

A second impact value $O_2$ reflecting impact of the overlap on the second cell is defined as a ratio of the determined intersecting area and the determined coverage area of the second cell. $O_2$ may be de defined as $$O_2 = \frac{I \times 100}{A_2}$$

where the factor 100 is for expressing the result as a percentage.

FIG. 4B shows a similar example as FIG. 4A with a base station 411 of a first cell, coverage area 413 of the first cell, a base station 412 of a second cell, and coverage area 414 of the second cell. Coverage areas 403 and 404 of the first and second cell overlap at intersecting area 415. In this example the coverage area 413 of the first cell fully overlaps with the coverage area 414 of the second cell and thereby the first cell has an impact on the second cell over the whole coverage area 414 of the second cell. Coverage area 414 of the second cell on the other hand overlaps only part of the coverage area 413 of the first cell. It is clear that in this example the second impact value $O_2$ is much larger than the first impact value $O_1$. This example illustrates that one cell may have significant impact on another cell, but the vice versa is not necessarily true. In principle impact of cells on each other could be approximated for example based on antenna angles and distance between the base stations of the cells but in this example case such approximation would not give accurate results as the inter-cell impact is not balanced. Example embodiments of present disclosure, on the other hand, provide accurate results also in this case.

FIG. 4C shows an example where certain percentile of users is considered for determination of the coverage area of the cells. In the shown example scenario, the cell coverage area is split into sub-areas, each sub-area covering certain percentile of users. FIG. 4C shows a base station 421 of a first cell, a coverage area 425 covering $50^{th}$ percentile of the first cell, a coverage area 426 covering $50^{th}$-$90^{th}$ percentile of the first cell, a base station 423 of a second cell, and coverage area 427 covering $50^{th}$ percentile of the second cell, and a coverage area 428 covering $50^{th}$-$90^{th}$ percentile of the second cell. It can be seen that the coverage areas 426 and 427 of the first and second cell overlap at intersecting area 431, and the coverage areas 426 and 428 of the first and second cell overlap at intersecting area 432. The coverage area 425 of the first cell does not have any overlap with the second cell.

In an example setup, the following impact values can be obtained in the scenario of FIG. 4C using the equations discussed in connection with FIG. 4A:

first cell 50 vs. second cell 50: 0.0
first cell 50 vs. second cell 50-90: 0.0
first cell 50-90 vs. second cell 50: 14.84
first cell 50-90 vs. second cell 50-90: 6.88
second cell 50 vs. first cell 50: 0.0
second cell 50-90 vs. first cell 50: 0.0
second cell 50 vs. first cell 50-90: 89.32
second cell 50-90 vs. first cell 50-90: 73.66.

Figure 5A:
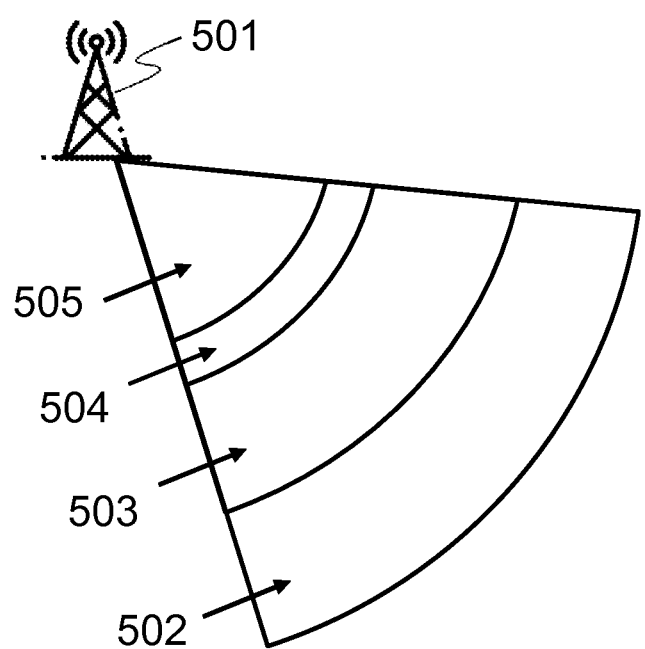
FIGS. 5A-5B illustrate examples related to uneven user distribution.
Figure 5B:
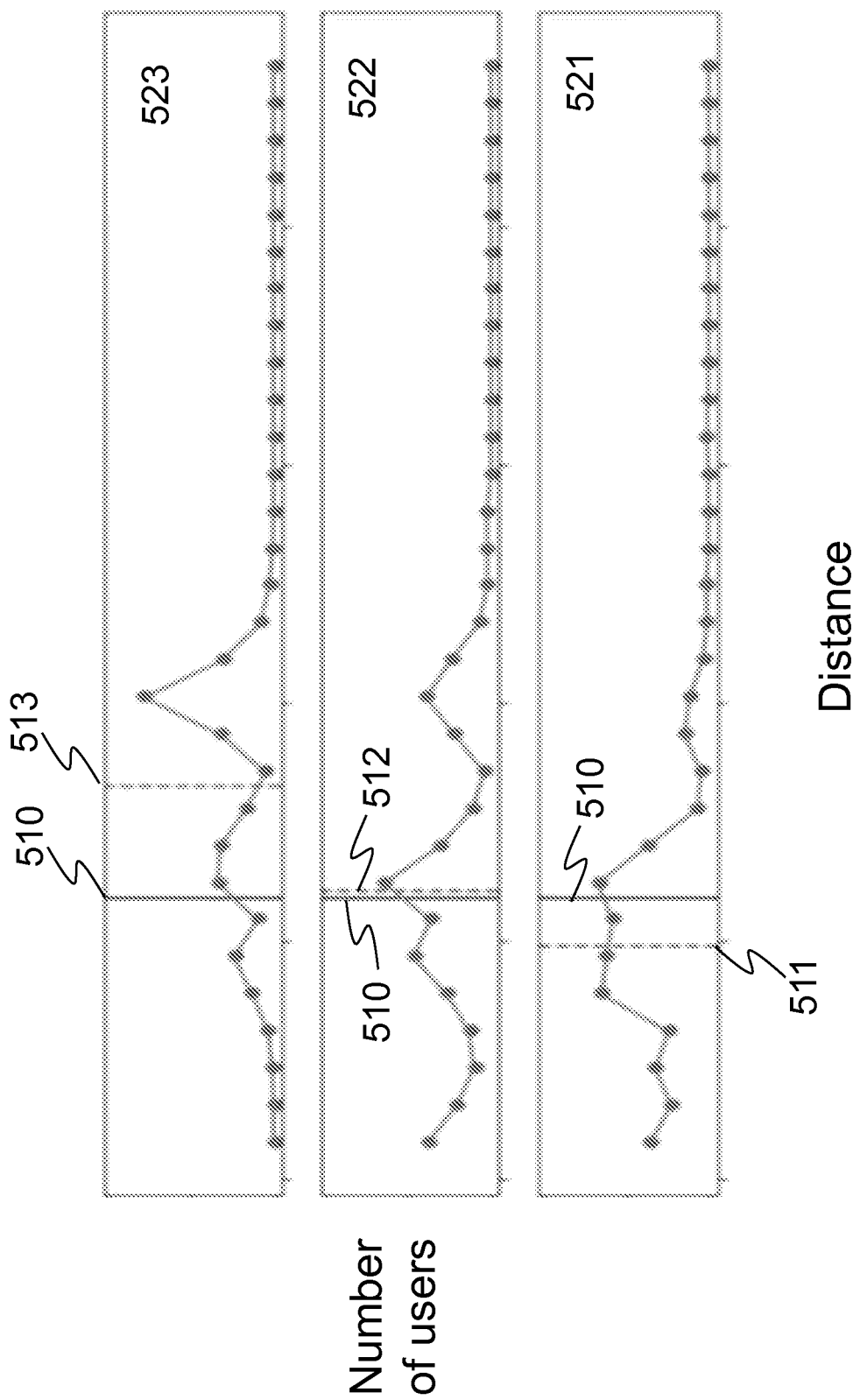

User distribution in cells can be non-uniform with respect to time and distance. Also amount of traffic can be non-uniform as certain users generate more traffic than others. FIGS. 5A-5B illustrate examples related to uneven user distribution. FIG. 5A shows coverage area of a base station 501 split into four sub-areas (502-505) each having equal number of users. The sub-areas may be associated with for example $20^{th}$ (sub-area 505), $40^{th}$ (sub-area 504), $60^{th}$ (sub-area 503), and $80^{th}$ (sub-area 502) percentile of users. It can be seen that for example the sub-area 504 is smaller than the other sub-areas, whereby user-density in that area is higher than in the other areas. Also amount of traffic in different sub-areas may be non-uniform. For example, area 504 may generate significantly more traffic than area 505. Likewise, two equally sized sub-areas may have different traffic density. That is, the amount of traffic generated in one area may be different from the amount of traffic generated in the other area.

In an example embodiment, non-uniform user distribution and/or amount of traffic can be taken into account by giving weights to the different sub-areas of cells. The sub-areas can be assigned a weight based on number of users in respective sub-area. This is beneficial if certain cell is divided into equally sized sub-areas. Likewise, the amount of traffic in sub-areas (either equally or unequally sized) of a cell can be used to determine and assign weight for the respective sub-area. In this way sub-areas with more users or more traffic cause higher impact values. The weight can be assigned based on one of the following: number of samples at a given distance, area of timing advance zones of a cell, signal attenuation at different distances, number of samples at given distance collected from two or more cells that impact each other.

FIG. 5B illustrates time varying user distribution. FIG. 5 shows number of users at different distances in one cell at three different moments of time 521, 522 and 523. Distance from the base station of the cell increases from left to right. Vertical line 510 indicates a static reference distance from the base station. Vertical lines 511, 512 and 513 show approximate distance from the base station for $50^{th}$ percentile of users. It can be seen that at the moment of time 521, the distance of the $50^{th}$ percentile is less than the reference distance, at the moment of time 522, the distance of the $50^{th}$ percentile is about the same as the reference distance, and at the moment of time 523, the distance of the $50^{th}$ percentile is more than the reference distance.

Time variance can be taken into account by collecting information about user distribution over a time period to obtain average user distribution. The information can be collected for example for one week, two weeks, a month or for some other period of time. In this way individual divergent usage patterns and/or sudden short-term changes do not affect the analysis. It is to be noted that in view of implementation of various embodiments, it is possible to analyze data from a shorter or longer period of time. At minimum information at one moment of time is enough for the analysis.

Figure 6A:
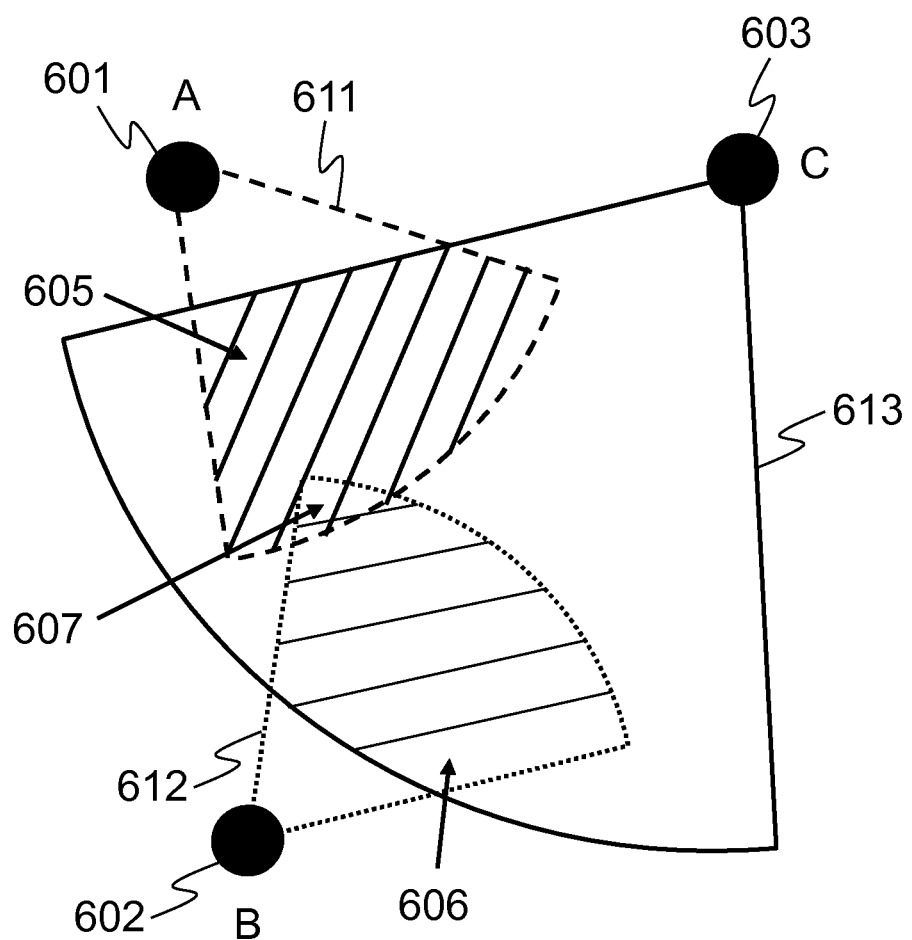
FIGS. 6A-6B illustrate examples related to multiple overlapping cells.
Figure 6B:
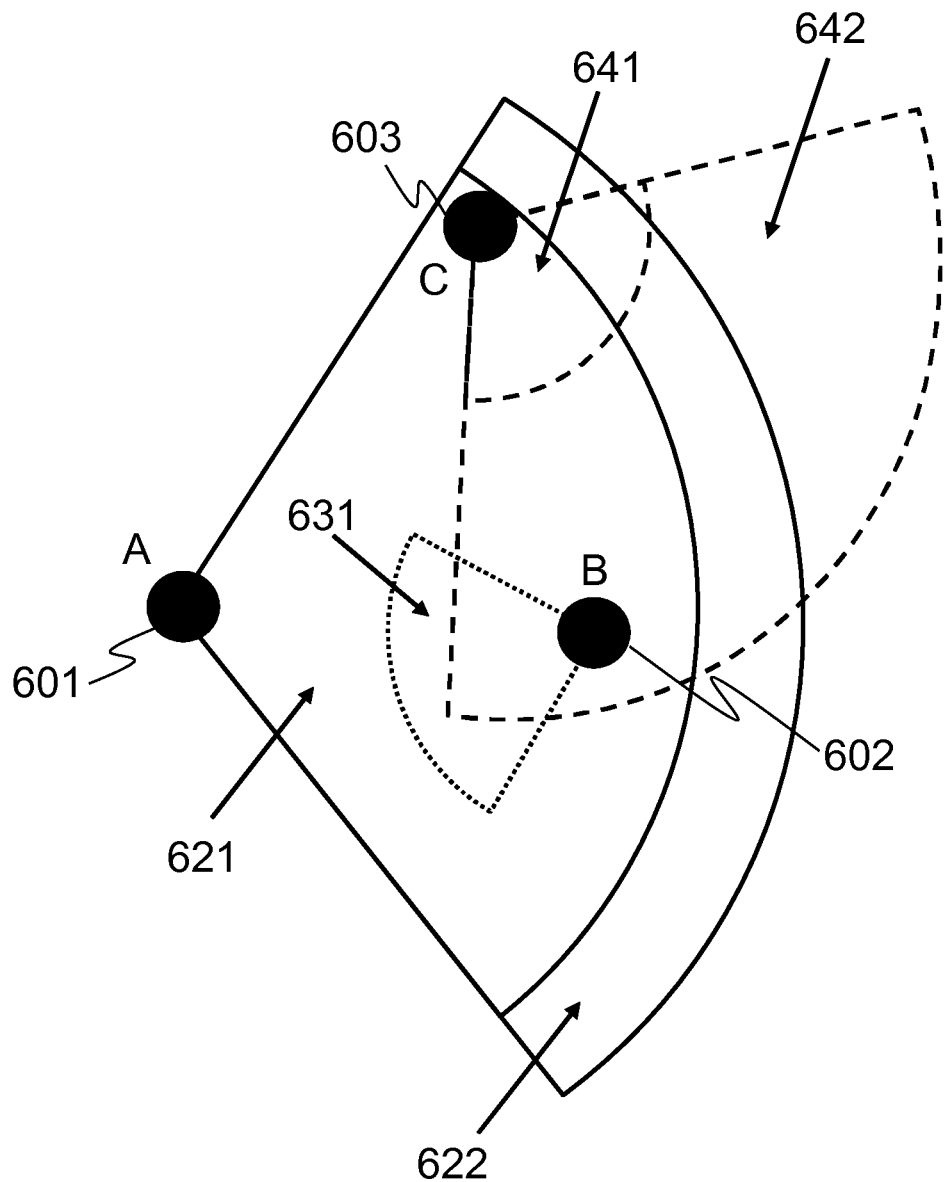

FIGS. 6A-6B illustrate examples related to multiple overlapping cells.

In an example embodiment, impact values related to multiple second cells are aggregated for a given first cell to determine total impact on the first cell. The impact of individual second cells or sub-areas of one or more second cells can be determined using the equations discussed in connection with FIG. 4A. The impact values thus obtained may then be aggregated (e.g. by adding up the individual impact values) to obtain total impact value for the first cell.

FIG. 6A shows an example scenario with three partially overlapping cells. The shown example scenario comprises a base station 601 of a cell A and coverage area 611 of the cell A, a base station 602 of a cell B and coverage area 612 of the cell B, and a base station 603 of a cell C and coverage area 613 of the cell C.

In view of the cell A, the cells B and C are second cells possibly causing impact on the cell A. There is overlap with the cell C at intersecting area 605 and overlap with the cell B at intersecting area 607. At the intersecting area 607 both the cell C and the cell B have an impact on the cell A. An aggregated impact value reflecting total impact on the cell A may be calculated by aggregating the impact values caused by the overlap with the cell C and overlap with the cell B.

In view of the cell B, the cells A and C are second cells possibly causing impact on the cell B. There is overlap with the cell C at intersecting area 606 and overlap with the cell A at intersecting area 607. At the intersecting area 607 both the cell C and the cell A have an impact on the cell B. An aggregated impact value reflecting total impact on the cell B may be calculated by aggregating the impact values caused by the overlap with the cell C and overlap with the cell A.

In view of the cell C, the cells B and A are second cells possibly causing impact on the cell C. There is overlap with the cell A at intersecting area 605 and overlap with the second cell at intersecting area 606. The intersecting areas 605 and 606 overlap at the intersecting area 607, where both the cell A and the cell B have an impact on the cell C. An aggregated impact value reflecting total impact on the cell C may be calculated by aggregating the impact values caused by the overlap with the cell A and overlap with the cell B.

FIG. 6B shows an example scenario with three partially overlapping cells. In this example scenario, cell coverage area of at least some cells is further split into sub-areas representing predefined percentiles of users. The shown example scenario comprises a base station 601 of a cell A, a base station 602 of a cell B, and a base station 603 of a cell C. Coverage area of the cell A is split into two sub-areas 621 and 622. The sub-area 621 may represent for example $50^{th}$ percentile of users and the sub-area 622 may represent for example $50^{th}$-$90^{th}$ percentile of users. Coverage area 631 of the cell B may represent for example $85^{th}$ percentile of users. Coverage area of the cell C is split into two sub-areas 641 and 642. The sub-area 641 may represent for example $40^{th}$ percentile of users and the sub-area 642 may represent for example $40^{th}$-$80^{th}$ percentile of users. It is to be noted that percentiles defined herein area given simply as an example and different selection of percentiles of users can be used. For example, same percentiles may be used in all cells to provide comparable results, but also other choices are possible.

In view of the cell A, the cells B and C are second cells possibly causing impact on the cell A. The coverage area 631 of the cell B overlaps and impacts the sub-area 621 of the cell A but not the sub-area 622 of the cell A. The sub-areas 641 and 642 of the cell C partially overlap and thereby impact both the sub-areas 621 and 622 of the cell A.

In view of the cell B, the cells A and C are second cells possibly causing impact on the cell A. The sub-area 621 of the cell A fully overlaps and thus impact the coverage area 631 of the cell B. The sub-area 642 of the cell C partially overlaps and thereby impacts the coverage area 631 of the cell B. The sub-area 641 of the cell C and the sub-area 622 of the cell B do not have overlapping area with the cell B.

In view of the cell C, the cells B and A are second cells possibly causing impact on the cell A. The coverage area 631 of the cell B partially overlaps and impacts the sub-area 642 of the cell C but not the sub-area 641 of the cell C. The sub-areas 621 and 622 of the cell A partially overlap and thereby impact both the sub-areas 641 and 642 of the cell C.

Without in any way limiting the scope, interpretation, or application of the claims appearing below, a technical effect of one or more of the example embodiments disclosed herein is ability to dynamically analyze cell overlaps in an efficient and adaptive manner. The results thus obtained may be used for network management operations and consequently network performance may be improved.

Another technical effect of one or more of the example embodiments disclosed herein is ability to analyze cell overlaps based on data that is easily available without more complicated data such as trace data. Thereby the solution is easy to implement and reliable to follow.

Another technical effect of one or more of the example embodiments disclosed herein is improved analysis as the results of the analysis are based on actual cell size and actual user distribution instead of planned cell sizes. In this way actually experienced cell overlap can be determined. As the cell overlaps are analyzed based on actual experienced service areas and actual user distributions of each cell, there is no need to rely for example on potential of the mobile devices to be served by different cells or on signal levels from neighboring cells.

Yet another technical effect of one or more of the example embodiments disclosed herein is that the analysis is suitable for heterogenous network deployments with varying cell sizes.

If desired, the different functions discussed herein may be performed in a different order and/or concurrently with each other. Furthermore, if desired, one or more of the before-described functions may be optional or may be combined.

Although various aspects of the disclosed embodiments are set out in the independent claims, other aspects of the disclosed embodiments comprise other combinations of features from the described embodiments and/or the dependent claims with the features of the independent claims, and not solely the combinations explicitly set out in the claims.

It is also noted herein that while the foregoing describes example embodiments of the present disclosure, these descriptions should not be viewed in a limiting sense. Rather, there are several variations and modifications, which may be made without departing from the scope of the present disclosure as defined in the appended claims.

The invention claimed is:

1. A computer implemented method of cell overlap analysis for cells of a communication network for the purpose of controlling the communication network, the method comprising
    determining a coverage area of a first cell and a second cell of the communication network;
    determining an intersecting area as an area where the determined coverage area of the first cell and the determined coverage area of the second cell overlap; and
    determining a first impact value reflecting impact of the overlap on the first cell as a ratio of the determined intersecting area and the determined coverage area of the first cell;
    wherein the determination of the coverage area of a cell is based on user distribution in the respective cell and wherein the user distribution of a cell is based on approximate user locations in the respective cell.

2. The method of claim 1, further comprising determining a second impact value reflecting impact of the overlap on the second cell as a ratio of the determined intersecting area and the determined coverage area of the second cell.

3. The method of claim 2, further comprising outputting the determined first impact value or the determined second impact value.

4. The method of claim 2, further comprising using the determined first impact value or the determined second impact value for determining value for at least one network parameter in the communication network.

5. The method of claim 2, further comprising using the determined first impact value or the determined second impact value for one or more of the following: identifying overshooter cells in the communication network, analyzing and adjusting antenna tilts in the communication network, detecting or reducing overlap between cells in the communication network, analyzing and adjusting cell neighborhoods in the communication network, and controlling energy saving procedures in the communication network.

6. The method of claim 1, wherein predefined percentile of users is taken into account in determination of the cell coverage of a cell.

7. The method of claim 6, wherein the predefined percentile of users is different for the first cell and the second cell.

8. The method of claim 6, wherein the predefined percentile of users is the same for the first cell and the second cell.

9. The method of claim 1, wherein the approximate user locations are determined based on timing advance values obtained from the cells of the communication network.

10. The method of claim 1, wherein determination of the cell coverage of a cell is further based on cell coordinates, antenna beam width, and antenna bearing of the respective cell.

11. The method of claim 1, wherein the cell overlap analysis is performed for a plurality of pairs of first and second cells.

12. The method of claim 1, further comprising omitting user distribution information obtained during periods of time when at least one of the first cell and the second cell is not in use.

13. The method of claim 1, further comprising splitting coverage areas of at least one of the first and second cells into a plurality of sub-areas and performing the cell overlap analysis separately for different sub areas.

14. The method of claim 13, further comprising taking into account non-uniform user distribution by giving weight to a certain sub-area based on number of users or amount of traffic in the respective sub-area.

15. The method of claim 1, further comprising aggregating, for a given first cell, impact values related to multiple second cells to determine total impact on the first cell.

16. An apparatus comprising
    a processor, and
    a memory including computer program code; the memory and the computer program code configured to, with the processor, cause the apparatus to perform cell overlap analysis for cells of a communication network for the purpose of controlling the communication network by:
    determining a coverage area of a first cell and a second cell of the communication network;
    determining an intersecting area as an area where the determined coverage area of the first cell and the determined coverage area of the second cell overlap; and
    determining a first impact value reflecting impact of the overlap on the first cell as a ratio of the determined intersecting area and the determined coverage area of the first cell;
    wherein the determination of the coverage area of a cell is based on user distribution in the respective cell and wherein the user distribution of a cell is based on approximate user locations in the respective cell.

17. A non-transitory computer-readable storage medium comprising computer executable program code which when executed by a processor causes an apparatus to perform cell overlap analysis for cells of a communication network for the purpose of controlling the communication network by:
    determining a coverage area of a first cell and a second cell of the communication network;

determining an intersecting area as an area where the determined coverage area of the first cell and the determined coverage area of the second cell overlap; and determining a first impact value reflecting impact of the overlap on the first cell as a ratio of the determined intersecting area and the determined coverage area of the first cell;

wherein the determination of the coverage area of a cell is based on user distribution in the respective cell and wherein the user distribution of a cell is based on approximate user locations in the respective cell.

* * * * *